United States Patent [19]
Takasaki et al.

[11] 4,204,176
[45] May 20, 1980

[54] VARIABLE EQUALIZER

[75] Inventors: Yoshitaka Takasaki, Tokorozawa; Yasuhiro Kita, Hachioji; Junichi Nakagawa, Tokorozawa; Kohei Ishizuka, Hachioji, all of Japan

[73] Assignee: Hitachi, Ltd., Japan

[21] Appl. No.: 893,014

[22] Filed: Apr. 3, 1978

[30] Foreign Application Priority Data

Apr. 18, 1977 [JP] Japan .................................. 52-43561

[51] Int. Cl.$^2$ .............................................. H03H 7/14
[52] U.S. Cl. .................................. 333/28 R; 330/109; 330/151; 330/294; 330/304
[58] Field of Search ............. 333/28 R; 330/151, 294, 330/304

[56] References Cited

U.S. PATENT DOCUMENTS

| | | | |
|---|---|---|---|
| 2,981,892 | 4/1961 | Franks et al. | 333/28 R X |
| 3,743,957 | 7/1973 | Feistel | 330/151 X |
| 3,939,437 | 2/1976 | Adam | 330/151 X |

*Primary Examiner*—Paul L. Gensler
*Attorney, Agent, or Firm*—Craig and Antonelli

[57] ABSTRACT

A variable equalizer whose frequency characteristic varies in a range of $1-1/Y(f)^2$ when the gain x of a variable amplifier varies from 0 (zero) to ∞ (infinity), and which reduces the number of shaping networks for the variable frequency characteristic.

It is constructed of a forward pass circuit which consists of a variable amplifier and a frequency-dependent first circuit connected in the order mentioned between input and output terminals, a feedback pass circuit which is dependent upon the frequency and which feeds-back an output of the variable amplifier to an input thereof, and a feed forward pass circuit which is independent of the frequency and which feeds forward part of the input of the variable amplifier to an output of the first circuit.

5 Claims, 6 Drawing Figures

VARIABLE EQUALIZER

LIST OF PRIOR ART (37 CFR 1. 56 (a))

The following reference is cited to show the state of the art:
U.S. Pat. No. 4,004,253

BACKGROUND OF THE INVENTION (1) Field of the Invention

This invention relates to a variable equalizer. More particularly, it relates to a variable equalizer which is incorporated in a transmission line in order to compensate for a fluctuation in the frequency characteristic of a cable for communication and to guarantee the transmission characteristic thereof.

(2) Description of the Prior Art

As variable equalizers to be used in transmission lines for communication, there have heretofore been known many types complying with required frequency characteristics and intended uses. The inventors have proposed variable equalizers employing no inductance element which have comparatively simple circuit arrangements and which can be easily fabricated as integrated circuits (IC's) (U.S. Pat. No. 4,004,253 and U.S. Pat. No. 4,080,580). The variable equalizers according to these inventions comprise in combination a circuit which has a frequency characteristic $Y(f)$ dependent upon the frequency f, and a variable amplifier which is independent of the frequency (and whose gain is denoted by x). The characteristic or transfer function $v(f, x)$ of the variable equalizer is a linear equalization characteristic of:

$$v(f, x) = \frac{x + Y(f)}{x\, Y(f) + 1} \quad (1)$$

or a quadratic equalization characteristic of:

$$v(f, x) = \frac{x^2 + y\, x + Y(f)}{x^2\, Y(f) + y\, x + 1} \quad (2)$$

Here, $$y = \frac{[Y(f)^{u_o+1} - 1]\, x_o^2 + [Y(f)^{u_o} - Y(f)]}{x_o[1 - Y(f)^{u_o}]}$$

$$(0 < x_o < 1,\ 0 < u_o < 1).$$

Thus, when x varies from 0 (zero) to $\infty$ (infinity), the characteristic of the variable equalizer is varied from $Y(f)$ to $1/Y(f)$.

The characteristic of a variable equalizer, however, differs depending on the sort of a communication cable used or the transmission distance. In order to realize a variable equalizer adapted for communication cables of various transmission distances, it is required that the frequency characteristic of the variable equalizer varies in a range of $1-1/Y(f)^2$ in accordance with the variation of the gain x. In order to satisfy this requirement, a circuit having a frequency characteristic $1/Y(f)$ needs to be added to the output end of the variable equalizer having the frequency characteristic (1) or (2) as will be explained later with reference to the drawings. The circuits of the characteristics $Y(f)$ and $1/Y(f)$ are ones determining the frequency characteristic, and their constituent elements must have a high precision. Therefore, the addition of the circuit usually leads to a high cost.

SUMMARY OF THE INVENTION

It is accordingly an object of this invention to realize a variable equalizer whose frequency characteristic can be varied in a range of 1 to $1/Y(f)^2$ with a comparatively simple circuit.

In order to accomplish the object, this invention comprises a forward pass circuit in which an amplifier or attenuator including a variable element with its gain being independent of the frequency and a first circuit having an inverse characteristic $1/Y(f)$ to a reference frequency characteristic $Y(f)$ are arranged in the order mentioned between input and output terminals of a variable equalizer, a feed back pass circuit which has the reference frequency characteristic $Y(f)$ and which feeds back an output of said amplifier or attenuator to said input terminal, and a feed forward pass circuit which adds part of an input of said amplifier or attenuator to an output of said first circuit and whose characteristic is independent of the frequency.

According to the variable equalizer of this invention, a predetermined variable equalization characteristic can be realized with a smaller number of circuits having the reference frequency characteristic than is required in the prior-art variable equalizer, as will be explained later in connection with embodiments.

The above-mentioned and other objects and features of this invention will become more apparent from the following description of the embodiments taken with reference to the drawings.

DESCRIPTION OF THE PREFERRED EMBODIMENTS

Figure 1:
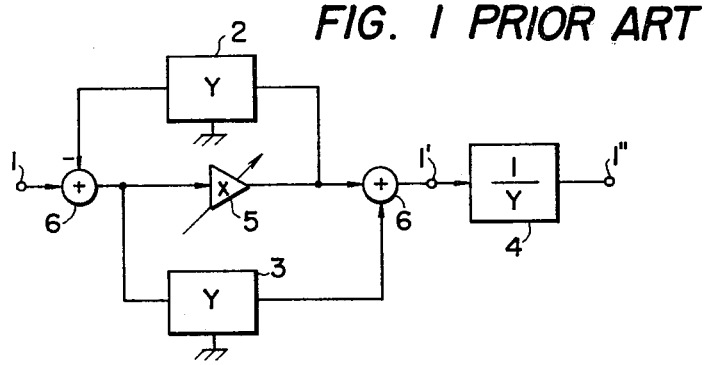
FIGS. 1 and 5 are block diagrams showing the constructions of prior-art, linear and quadratic variable equalizers, respectively.

FIG. 1 is a block diagram showing the construction of a linear variable equalizer whose frequency characteristic varies in a range of from 1 to $1/Y(f)^2$ by exploiting the variable equalizer proposed by the inventors before (U.S. Pat. No. 4,004,253). In the figure, a variable equalizer extending from an input terminal 1 to an output terminal 1' is the variable equalizer which is disclosed in the U.S. patent and whose frequency characteristic $v(f, x)$ is represented by Eq. (1) mentioned previously. When a circuit having a frequency characteristic $1/Y(f)$ is added to the output terminal 1', the frequency characteristic becomes:

$$V_e(f, x) = \frac{\frac{x}{Y(f)} + 1}{x\, Y(f) + 1} \quad (3)$$

Figure 2:
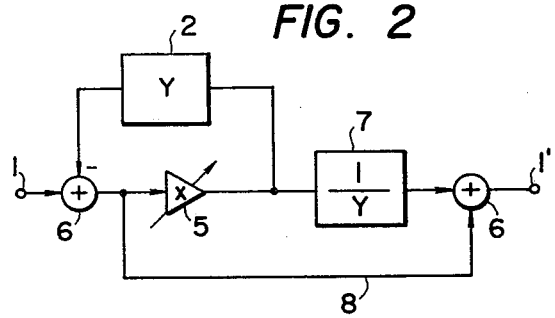
FIG. 2 is a block diagram showing the construction of a linear variable equalizer according to this invention.
Figure 3:
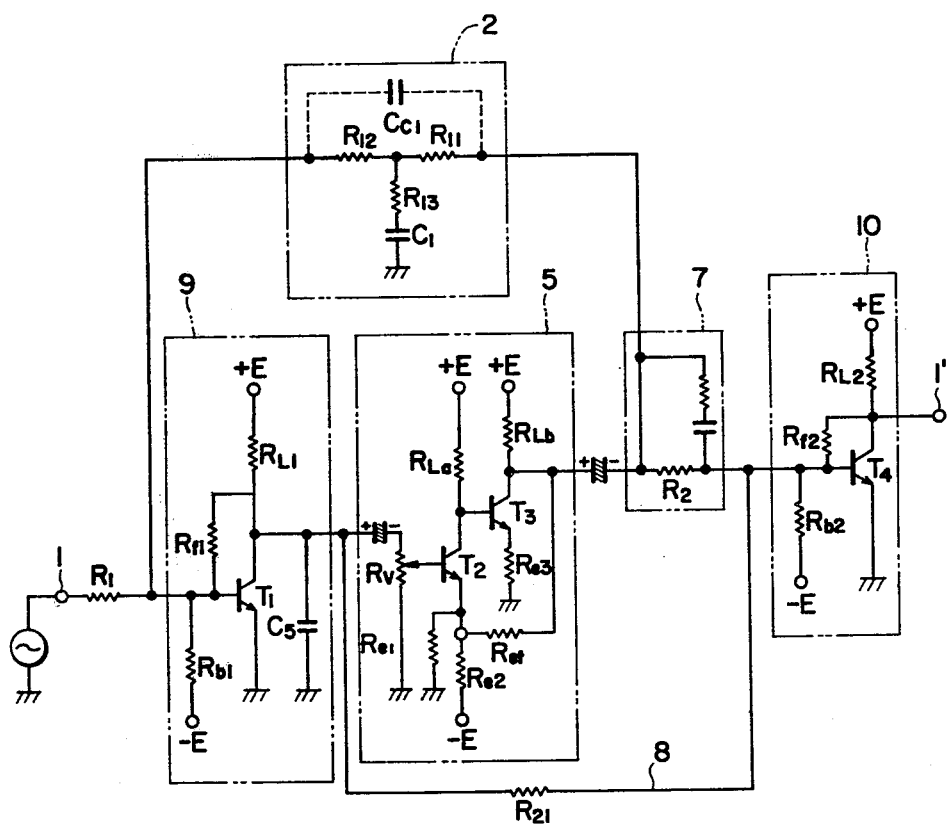
FIG. 3 shows an example of a concrete circuit of the variable equalizer according to this invention illustrated in FIG. 2.

FIG. 2 is a block diagram showing the construction of an embodiment of a variable equalizer according to this invention, while an example of a concrete circuit of the variable equalizer is shown in FIG. 3.

As shown in FIG. 2, in the present embodiment, a variable amplifier 5 and a first circuit 7 whose frequency characteristic is 1/Y(f) inverse to a reference frequency characteristic Y(f) are arranged in the order mentioned between an input terminal 1 and an output terminal 1' so as to construct a forward pass circuit. Part of an input signal of the variable amplifier 5 is added to an output of the first circuit 7 by a feed forward pass circuit 8. Part of an output of the variable amplifier 5 is put together with the input signal by an adder circuit 6 via a feedback pass circuit which is made up of a second circuit 2 having the reference frequency characteristic Y(f). Here, although the gain x of the amplifier 5 can be varied from 0 (zero) to ∞ (infinity) theoretically, it is set to about 0.1 to 10 in an actual circuit arrangement. Accordingly, in case where x is smaller than 1 (one), the circuit 5 becomes an attenuator. The reference frequency characteristic is substantially identical with the frequency characteristic of a cable for communication to be compensated for. The respective characteristics 1/Y(f) and Y(f) of the first circuit 7 and the second circuit 2 are transfer admittances. Accordingly, the gain of the variable equalizer in FIG. 2 becomes the same as Eq. (3) mentioned above. It is therefore understood that, when compared with the variable equalizer in FIG. 1, the embodiment in FIG. 2 can reduce the circuit requiring the specific frequency characteristic Y(f), in achieving the same characteristic.

FIG. 3 shows an embodiment of the concrete circuit of the variable equalizer illustrated in FIG. 2. In the concrete circuit arrangement, blocks which execute the same functions as in FIG. 2 are enclosed with one-dot chain lines and assigned the same symbols. Blocks 9 and 10 are inverter circuits. Since the inverter circuit 9 changes an adder into a subtractor and the inverter circuit 10 has no influence on the variable equalization characteristic, they will not be explained more. In FIG. 3, elements constituting the feedback pass circuit 2 have the following values:

$R_{12} = R_{11} = 500\Omega$,
$R_{13} = 125\Omega$,
$C_1 = 425$ pF

The variable amplifier 5 is made up of a resistor $R_V$ which has a voltage dividing rate of $1-(1/100)$, and an amplifier which has a constant amplification factor of 10. Accordingly, the variable range of the gain x becomes 10-1/10. The feed forward pass circuit 8 is constructed of only a fixed resistor of $R_{21} = 1$ k. As regards portions corresponding to the adders 6 in FIG. 2, currents are added by directly connecting lines.

Figure 4:
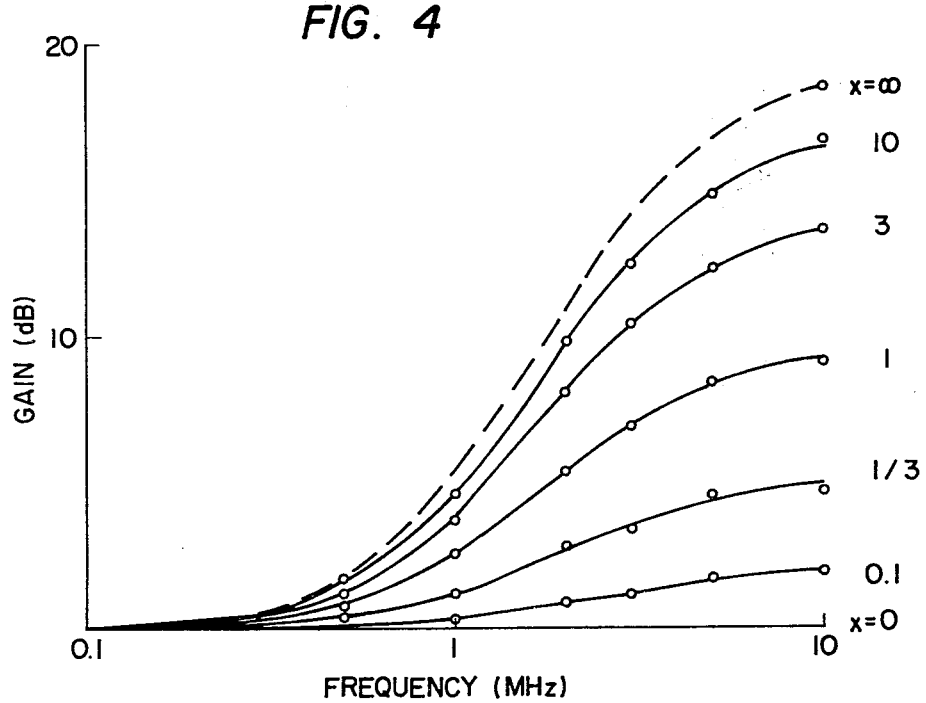
FIG. 4 is a graph showing the theoretical values and actually measured values of the frequency characteristic of the variable equalizer illustrated in FIG. 3.

FIG. 4 shows the frequency characteristic of the variable equalizer constructed of the circuit in FIG. 3, i.e., the gains in a signal frequency range of 0–10 MHz, in terms of values theoretically calculated and actually measured values. Solid lines correspond to the logical values, and white circles to the actual measurements.

Figure 5:
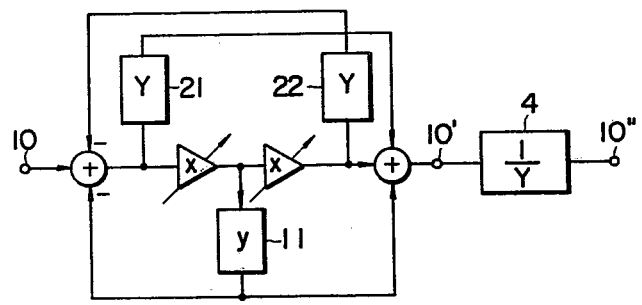

FIG. 5 is a block diagram showing the circuit arrangement of a quadratic variable equalizer wherein a circuit having a frequency characteristic 1/Y(f) is added to an output end 10' of the quadratic variable equalizer proposed by the inventors before (U.S. Pat. No. 4,080,580). The variable frequency characteristic or gain between an input terminal 10 and the output terminal 10' is represented by:

$$\frac{x^2 + x\, y(f) + 1}{x^2\, Y(f) + x\, y(f) + 1} \quad (4)$$

Accordingly, when the circuit 4 having the frequency characteristic 1/Y(f) is added to the circuit proposed previously, the overall frequency characteristic or gain $V_{2e}(f, x)$ becomes:

$$V_{2e} = \frac{x^2 \frac{1}{Y(f)} + x \frac{y(f)}{Y(f)} + 1}{x^2\, Y(f) + x\, y(f) + 1} \quad (5)$$

Figure 6:
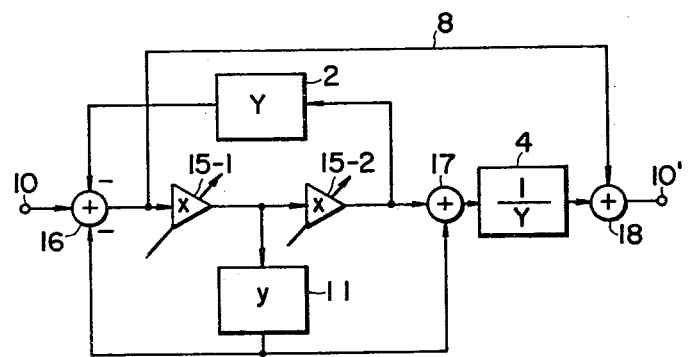
FIG. 6 is a block diagram showing the construction of a quadratic variable equalizer according to this invention as is an improvement on the variable equalizer of FIG. 5.

FIG. 6 is a block diagram showing the construction of a quadratic variable equalizer into which the variable equalizer of FIG. 5 is improved by this invention. The embodiment is composed of a feed pass circuit in which two variable amplifiers 15-1 and 15-2 each having a gain x and a circuit 4 having an inverse characteristic 1/Y(f) to a reference frequency characteristic Y(f) are arranged in the order mentioned between an input terminal 10 and an outut terminal 10', a feed back pass circuit 2 which feeds back part of an output of the variable amplifier 15-2 to the input terminal and which has the reference frequency characteristic Y(f), a feed forward pass circuit 8 which applies art of an input of the variable amplifier 15-1 to an output of the circuit 4, and circuits which apply an output of the variable amplifier 15-1 to the input of the variable amplifier 15-1 and the output of the variable amplifier 15-2 through a circuit 11 having a frequency characteristic y(f), respectively. The addition from the output of an adder 16 to an adder 18 can be realized by connecting the adders through a resistor or the like as shown in FIG. 3.

The frequency characteristic or gain of the quadratic variable equalizer becomes the same as Eq. (5) mentioned above.

It is apparent that, as compared with the quadratic variable equalizer shown in FIG. 5, the embodiment illustrated in FIG. 6 can be constructed by dispensing with one of the circuits having the reference frequency characteristic Y(f).

The circuit of the reference frequency characteristic Y(f) is a circuit affecting the frequency equalization characteristic. In actuality, it must have a high precision and is therefore very expensive. It is accordingly extraordinarily effective in the art that the number of the circuits having the frequency characteristic Y(f) can be lessened.

Likewise to the variable equalizers which the inventors proposed before (U.S. Pat. No. 4,004,253 and U.S. Pat. No. 4,080,580), the variable equalizer of this invention has the advantage of requiring no inductance element. This is extraordinarily effective in the manufacture of practical devices.

We claim:
1. A variable equalizer comprising:
   a forward pass circuit in which a variable amplifier having no frequency-dependency and a first circuit having an inverse characteristic to a reference frequency characteristic are arranged in the order mentioned between an input and an output of said variable equalizer, a feed back pass circuit which feeds back part of an output of said variable amplifier to an input thereof and which has said reference frequency characteristic, and a feed forward pass circuit which adds part of said input of said variable amplifier to an output of said first circuit and which has no frequency-dependency.

2. A variable equalizer according to claim 1, in which said variable amplifier is constructed of a voltage divider and an amplifier having a constant gain.

3. A variable equalizer according to claim 1, which has a transfer function of:

$$\frac{\frac{x}{Y(f)} + 1}{x\,Y(f) + 1}$$

where x is a gain of said variable amplifier, and Y(f) is a transfer admittance of said first circuit.

4. A variable equalizer according to claim 1, in which said variable amplifier is constructed of first and second variable amplifiers connected in series, and which further comprises an impedance circuit having its input terminal connected to a connection point between the two variable amplifiers and having its output terminal connected to the input terminal of said first variable amplifier and also to the output terminal of said second variable amplifier.

5. A variable equalizer according to claim 4, wherein said first circuit has a transfer admittance Y(f), each of said first and second variable amplifiers has a gain x and said impedance circuit has a transfer admittance y(f) and the transfer function of said variable equalizer is:

$$\frac{1}{Y(f)} \cdot \frac{x^2 + y(f)x + Y(f)}{x^2 Y(f) + Y(f)x + 1}$$

* * * * *